June 20, 1961  D. J. MARSHALL  2,989,098
TIRE STAND
Filed Aug. 3, 1959

INVENTOR.
DON J. MARSHALL
BY
Walter G. Finch

United States Patent Office 2,989,098
Patented June 20, 1961

2,989,098
TIRE STAND
Don J. Marshall, Baltimore, Md., assignor to Triest Manufacturing Works, Inc., Annapolis, Md., a corporation of Maryland
Filed Aug. 3, 1959, Ser. No. 831,187
2 Claims. (Cl. 144—288)

This invention relates generally to wheelwright tools, and more particularly it pertains to a stand for supporting and handling heavy vehicle tires and rims.

A large vehicle tire is awkward to handle. When installed on a rim, the last hand hold is covered and often crushed fingers or toes result from lifting attempts. Another source of accident is a result of the stooping required when working on a tire lying on the floor.

Several objects of the present invention, therefore, are to provide a combination handle and stand which is adaptable to various sizes of tires and rims and which is easily and inexpensively manufactured, and which is efficient and versatile in use.

Figure 1:
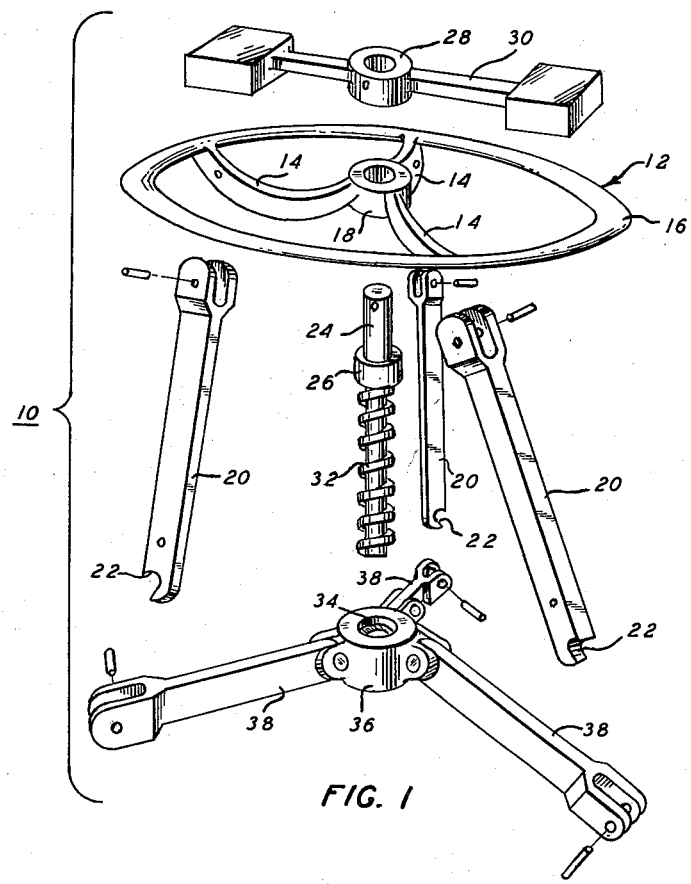
Figure 2:
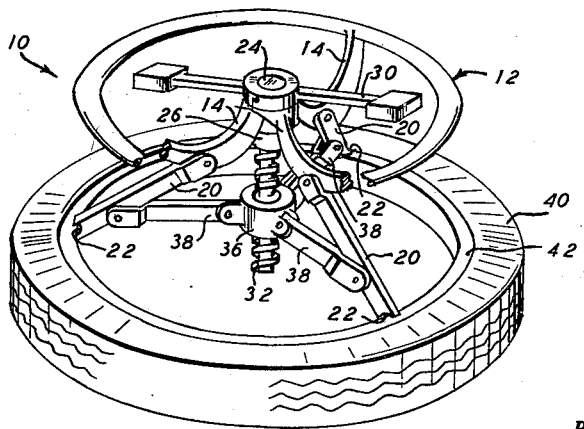

Other objects and advantages of the invention not specifically enumerated above will become more readily apparent and understood from the accompanying specification and drawings in which:

FIG. 1 is an exploded perspective view of the novel tire stand incorporating features of this invention; and FIG. 2 is a perspective view of the tire stand, in which the application thereof is illustrated.

This invention is directed to the novel details of a tire stand 10, as shown in FIG. 2. Stand 10 consists of the components illustrated in FIG. 1 where there is shown a base 12, consisting of a plurality of arched arms 14 radially joined to a smooth hoop 16 and to a center bearing 18. Each arm 14 is provided with a toggle link 20 which is arranged to be pin-pivoted at one end to the arm 14 near the hoop 16. The other end of each toggle link 20 is provided with a notch 22.

A shaft 24 is provided for the tire stand 10 and it is made with a collar 26. When the shaft 24 is inserted into the center bearing 18, this collar 26 bears thereagainst. The upper end of shaft 24 is then pinned within a hub 28 of a weighted fly 30, the whole assembly being so dimensioned that the weighted fly 30 is circumscribed by and depressed beneath the hoop 16.

The lower end of shaft 24 is provided with a screw thread 32 which fits or engages female threads 34 of a multi-armed clevis nut 36. A plurality of legs 38, equal in number to the toggle links 20, are hinged to the clevis nut 36. Additionally, the outer ends of these legs 38 are pin-pivoted to the toggle links 20 just above the notches 22.

When the weighted fly 30 is spun to the right, the screw thread 32 moves the clevis nut 36 upwardly, thus pulling the inner ends of the legs 38 with it. This toggle-like action folds toggle links 20 inwardly.

When the tire stand 10 is placed over a rimmed tire 40, as shown in FIG. 2, and the weighted fly 30 is spun to the left, the notches 22 in the unfolding toggle links 20 may be made to engage with rims 42 of various tire sizes and wedge thereagainst. By means of the base 12, one is enabled to safely and comfortably lift, tilt, or roll the tire 40. Furthermore, by inverting the entire assembly of FIG. 2, the base 12 supports the tire 40 at a convenient working height.

Obviously, many other modifications and variations of the present invention are possible in light of the above teachings. It is, therefore, to be understood that within the scope of the appended claims, the invention may be practiced otherwise than as specifically described.

What is claimed is:

1. A tire rim stand having an adjustable height for use with tire rims of different diameters, said stand being reversible from a rim supporting position to a manipulating position and comprising, a base having a large diameter loop and a bearing concentrically positioned therein, a plurality of identical arcuate, radially spaced arms integrally connecting said loop and bearing together, a plurality of links corresponding to said plurality of arms, each link having one end thereof pivotally connected to its respective arm substantially near the juncture with said loop and its opposite end notched, a shaft having its lower end extending through said central bearing and having its upper end threaded, a weighted fly means mounted for rotation with said shaft at the lower end thereof and being positioned below and circumscribed by said loop, an internally threaded clevis means arranged axially with said central bearing for receiving the upper threaded end of said shaft and having an identical plurality of pivotally mounted clevis arms connected thereto and extending radially outwardly therefrom, each said link of said plurality of links being pivotally connected intermediately its ends to the opposite end of its corresponding pivotally mounted clevis arm so that in the manipulating position of the stand the notched ends of said links can be arranged to engage the rim of a tire upon rotational movement of the weighted fly means in a predetermined direction and retracted therefrom upon rotational movement in an opposite direction.

2. A tire rim stand having an adjustable height for use with tire rims of different diameters, said stand being reversible from a rim supporting position to manipulating position and comprising, a large diameter loop type base having a concentrically arranged bearing integrally connected thereto by radially extending arms, clevis means including a corresponding number of pivotally mounted arms spaced axially from said base and centrally positioned with respect thereto, a corresponding number of links, each link being pivotally connected intermediate its ends to its respective arm of said clevis means and at one end to its respective arm of said base, the opposite ends of said links being notched to engage a tire rim, shaft means including a shaft having one end extending through said bearing, a weighted fly integrally secured on said one end of said shaft, the other end of said shaft being threadedly received by said clevis means, means located intermediate the ends of said shaft to bear against said bearing so that said base and clevis means can be moved toward as well as away from each other so as to retract as well as extend said links radially, respectively, with the notched ends of said links in the manipulating position of the stand being arranged to engage the rim of a tire upon rotational movement of said weighted fly in a predetermined direction and retracted therefrom upon rotational movement of said weighted fly in the opposite direction.

References Cited in the file of this patent

UNITED STATES PATENTS

| | | |
|---|---|---|
| 617,047 | Rakus | Jan. 3, 1899 |
| 1,323,871 | La Chapelle | Dec. 2, 1919 |
| 1,451,344 | Robinett | Apr. 10, 1923 |
| 1,564,092 | Miller | Dec. 1, 1925 |
| 1,575,869 | Schmidt | Mar. 9, 1926 |
| 2,446,963 | Stolz | Aug. 10, 1948 |
| 2,681,692 | Weaver | June 22, 1954 |

FOREIGN PATENTS

| | | |
|---|---|---|
| 478,238 | Germany | June 21, 1929 |